US010186741B2

(12) United States Patent
Nealis et al.

(10) Patent No.: US 10,186,741 B2
(45) Date of Patent: Jan. 22, 2019

(54) SPRING-LOADED WAVEGUIDE COUPLING FOR CONNECTING A WAVEGUIDE COMPONENT TO AN EXTERNAL RF COMPONENT

(71) Applicant: ZTE Corporation, Shenzhen (CN)

(72) Inventors: Edwin Nealis, Cary, NC (US); Ying Shen, Chapel Hill, NC (US); Zhiping Feng, Chapel Hill, NC (US)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/461,420

(22) Filed: Mar. 16, 2017

(65) Prior Publication Data
US 2017/0271739 A1    Sep. 21, 2017

Related U.S. Application Data

(60) Provisional application No. 62/309,901, filed on Mar. 17, 2016.

(51) Int. Cl.
| | |
|---|---|
| *H01P 1/04* | (2006.01) |
| *H01P 3/12* | (2006.01) |
| *H01P 5/08* | (2006.01) |
| *H04B 1/40* | (2015.01) |

(52) U.S. Cl.
CPC ............. *H01P 1/042* (2013.01); *H01P 3/12* (2013.01); *H01P 5/08* (2013.01); *H04B 1/40* (2013.01)

(58) Field of Classification Search
CPC ..................................................... H01P 1/042
USPC ................................................. 333/254, 255
See application file for complete search history.

(56) References Cited

U.S. PATENT DOCUMENTS

| | | | |
|---|---|---|---|
| 3,221,279 A | * | 11/1965 | Gross ............. H01P 1/042 285/90 |
| 4,824,400 A | * | 4/1989 | Spinner ............ H01P 1/045 333/254 |
| 2013/0316727 A1 | | 11/2013 | Edge |

(Continued)

FOREIGN PATENT DOCUMENTS

| | | |
|---|---|---|
| EP | 1285552 B1 | 2/2007 |
| WO | WO2013/119077 A1 | 8/2013 |
| WO | WO2015/069051 A1 | 5/2015 |

OTHER PUBLICATIONS

ZTE Corporation et al., International Search Report and Written Opinion, PCT/US2016/045983, dated Nov. 10, 2016, 10 pgs.

(Continued)

*Primary Examiner* — Benny Lee
(74) *Attorney, Agent, or Firm* — Morgan, Lewis & Bockius LLP

(57) ABSTRACT

A radio-frequency (RF) component includes a first portion of a waveguide configured to transmit an electro-magnetic (EM) wave. The RF component includes a waveguide coupling configured to receive the EM wave from the first portion of the waveguide and transmit the EM wave to an external RF component. The waveguide coupling includes a waveguide plate having a second portion of the first waveguide formed therein; a waveguide spacer having a third portion of the first waveguide formed therein; and a conductive spring circumferentially disposed around the first waveguide in between the waveguide plate and the waveguide spacer.

13 Claims, 10 Drawing Sheets

(56) References Cited

U.S. PATENT DOCUMENTS

2014/0293968 A1 10/2014 Ebrahimi Tazeh Mahalleh et al.
2016/0028141 A1* 1/2016 Shimizu et al. ........ H01P 1/042
343/772

OTHER PUBLICATIONS

ZTE Corporation et al., International Preliminary Report on Patentability, PCT/US2016/045983, dated Feb. 13, 2018, 8 pgs.

* cited by examiner

SPRING-LOADED WAVEGUIDE COUPLING FOR CONNECTING A WAVEGUIDE COMPONENT TO AN EXTERNAL RF COMPONENT

CROSS-REFERENCE TO RELATED APPLICATION

This application claims the benefit and priority of U.S. Provisional Patent Application No. 62/309,901, entitled "SPRING-LOADED WAVEGUIDE COUPLING" filed on Mar. 17, 2016, the entire disclosure of which is incorporated herein by reference.

TECHNICAL FIELD

The disclosed implementations relate generally to couplings for separate portions of a waveguide, and more specifically to waveguide couplings that couple a waveguide in an outdoor radio with a waveguide on an antenna feed head.

BACKGROUND

Radio frequency (e.g., microwave) antennas are designed to transmit and receive radio frequency (RF) signals from an attached RF radio to another RF antenna with another RF radio attached. The RF radio and antenna are attached through a waveguide that has an interface where the two meet. This waveguide interface is critical to the quality of the RF signal. In addition to proper alignment between the waveguide of the antenna and the RF radio, the contact between the mating surfaces surrounding the waveguide is crucial. The surfaces must make contact in order for electrical continuity to be established between the surfaces surrounding the waveguide. This continuity is needed so that the waveguide in the RF radio and the waveguide in the antenna act as a single continuous waveguide so that the RF signal can properly propagate.

In a typical design, referred to as "direct mount," an antenna assembly is mounted to a pole on a building or a tower using brackets. An RF radio enclosure (called an outdoor unit (ODU)) is mounted to a mounting plate of the antenna assembly. The antenna assembly has a feed head that is the RF interface to the ODU. The ODU has an antenna port which is the RF interface to the antenna. The surfaces surrounding the waveguide of the antenna feed head and the ODU antenna port must be in contact with each other to ensure proper propagation of the RF signals. The antenna feed head and the ODU antenna port are typically comprised of rigid metal parts.

Hence, it is necessary to account for tolerances in the assemblies when designing the mounting of the ODU to the antenna assembly to achieve electrical continuity across the parts. If the interface is rigid between the antenna feed head and the ODU antenna port then the tolerances must be absorbed between the mounting points of the ODU and the antenna assembly in order to ensure that the surfaces surrounding the waveguide of the antenna feed head and the ODU antenna port are in contact with each other.

SUMMARY OF THE INVENTION

To address the aforementioned problems, some implementations provide a radio-frequency (RF) component. The RF component includes a first portion of a first waveguide configured to transmit a first electro-magnetic (EM) wave. The RF component further includes a first waveguide coupling configured to receive the first EM wave from the first portion of the first waveguide and transmit the first EM wave to an external RF component. The first waveguide coupling includes a waveguide plate having a second portion of the first waveguide formed therein, a waveguide spacer having a third portion of the first waveguide formed therein, and a conductive spring circumferentially disposed around the first waveguide in between the waveguide plate and the waveguide spacer. The RF component further includes a first portion of a second waveguide configured to transmit a second EM wave. The first portion of the first waveguide is rigidly coupled with the first portion of the second waveguide. The RF component further includes a second waveguide coupling configured to receive the second EM wave from the first portion of the second waveguide and transmit the second EM wave to the external RF component.

In some embodiments, the first waveguide coupling is configured to transmit the first EM wave to a first external waveguide of the external RF component. The second waveguide coupling is configured to transmit the second EM wave to a second external waveguide of the external RF component. The first external waveguide is rigidly coupled with the second external waveguide.

In some embodiments, the waveguide spacer has a first coupling surface that couples with the waveguide plate and a second coupling surface that couples with the first external waveguide.

In some embodiments, the second waveguide coupling includes: a second waveguide plate having a second portion of the second waveguide formed therein, a second waveguide spacer having a third portion of the second waveguide formed therein, and a second conductive spring circumferentially disposed around the second waveguide in between the second waveguide plate and the second waveguide spacer.

In some embodiments, the first waveguide coupling and the second waveguide coupling comprise an interface for the external RF component.

In some embodiments, the RF component further includes a mechanical mounting for attaching the RF component to the external RF component, wherein attaching the RF component to the external RF component compresses the conductive spring to improve an electrical connection of the first waveguide coupling.

In some embodiments, the waveguide spacer includes a first flange and the conductive spring is circumferentially disposed around the first flange.

In some embodiments, the second portion of the first waveguide formed in the waveguide plate is inserted into the third portion of the first waveguide formed in the waveguide spacer.

In some embodiments, the RF component further includes a housing having a bore hole. The waveguide spacer includes a second flange disposed at least partially within the bore hole.

In some embodiments, the external RF component is one of: an antenna feed head; an orthogonal mode transducer; an RF combiner; an RF splitter; and an RF hybrid. In some embodiments, the RF component is one of: an orthogonal mode transducer; an RF combiner; an RF splitter; and an RF hybrid.

In some embodiments, the RF component includes a 2-transmitter/2-receiver (2T2R) outdoor unit (ODU).

In some embodiments, the first waveguide coupling and the second waveguide coupling form an interface for the 2T2R ODU.

In some embodiments, the waveguide spacer includes a first hole and a second hole, wherein each of the first hole and the second hole receive a respective guide pin that aligns the second portion of the waveguide with the external RF component.

In some embodiments, the waveguide plate includes a third hole and a fourth hole, wherein each of the third hole and the fourth hole are for receiving a guide pin that aligns the first portion of the waveguide with the second portion of the waveguide.

BRIEF DESCRIPTION OF THE DRAWINGS

For a better understanding, reference should be made to the following detailed description taken in conjunction with the accompanying drawings, in which.

Like reference numerals refer to corresponding parts throughout the drawings.

DETAILED DESCRIPTION OF IMPLEMENTATIONS

Figure 1:
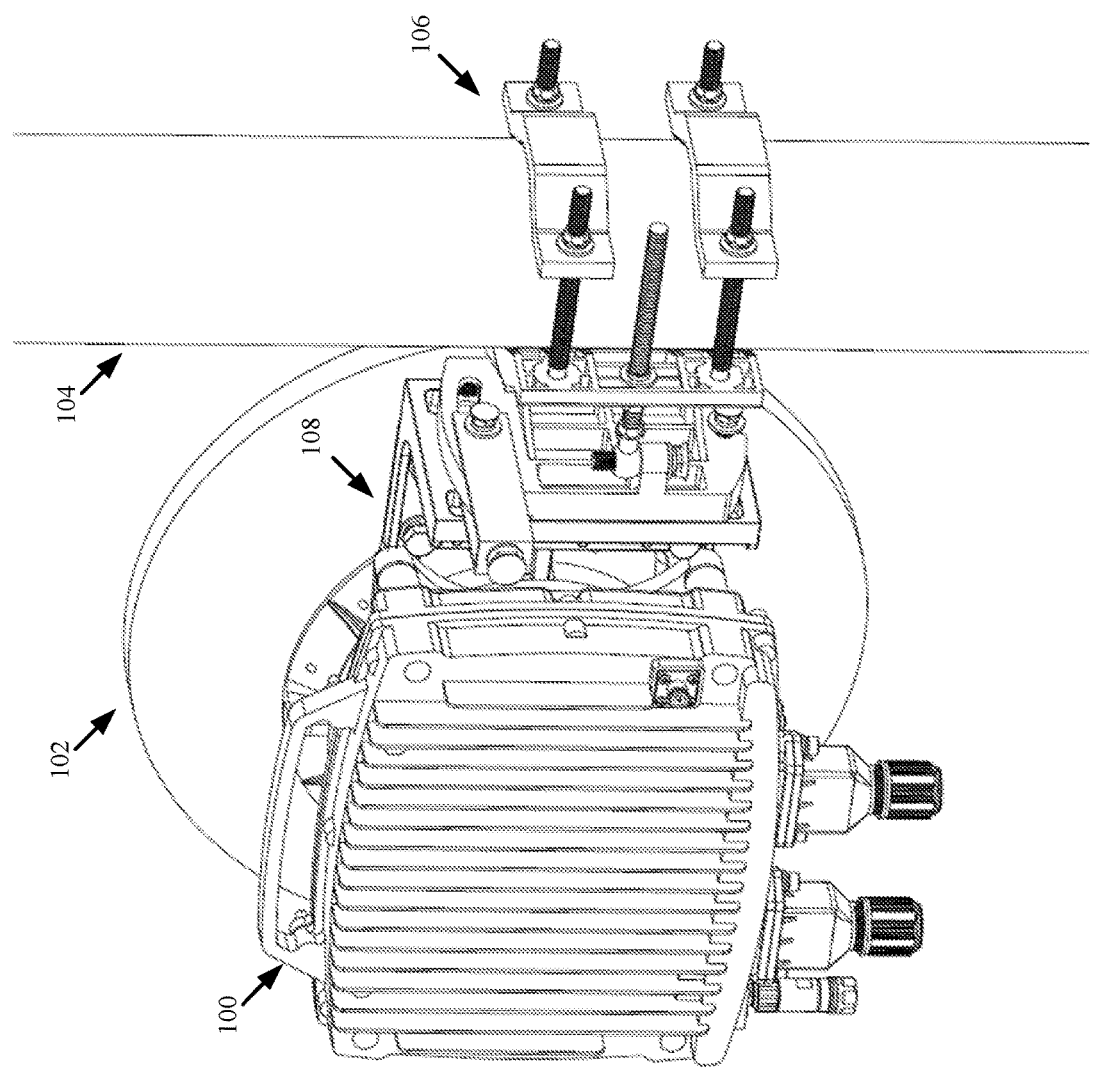
FIG. 1 illustrates an outdoor unit (ODU) coupled with an antenna assembly, in accordance with some embodiments.

Reference will now be made in detail to various implementations, examples of which are illustrated in the accompanying drawings. In the following detailed description, numerous specific details are set forth in order to provide a thorough understanding of the present disclosure and the described implementations herein. However, implementations described herein may be practiced without these specific details. In other instances, well-known methods, procedures, components, and mechanical apparatus have not been described in detail so as not to unnecessarily obscure aspects of the implementations.

As used herein, the term "radio frequency (RF)" includes microwave frequencies. In some embodiments, RF frequencies are frequencies in the range extending from around 3 kHz to 300 GHz. In some embodiments, RF frequencies include very low frequency (VLF) signals, low frequency (LF) signals, medium frequency (MF) signals, high frequency (HF) signals, very high frequency (VHF) signals, ultra-high frequency (UHF) signals, super-high frequency (SHF) signals, and extremely-high frequency (EHF) signals. Microwave frequencies are generally in a band between 1 GHz to 300 GHz, but definitions may vary. Many microwave applications are within the 1 GHz to 40 GHz range. Such applications include GPS and mobile phone communications in the L band (1 GHz to 2 GHz), long-distance radio telecommunications in the C band (4 GHz to 8 GHz), satellite communications in the X band (4 GHz to 8 GHz) or other conventionally-used bands, and radar in a variety of microwave bands.

One conventional method of coupling waveguides is to use spring-loaded screws, which attach the ODU to the antenna assembly mounting plate. In this method, the ODU is not rigidly screwed to the mounting plate but the enclosure is instead pushed toward the antenna assembly by springs surrounding the mounting screws on the ODU. An alternative method uses draw latches to absorb the tolerances. Still another method allows a gap between the ODU mounting points and the antenna assembly mounting plate. As the screws or draw latches are tightened, the mounting plate bends until the gap is closed. The bending of the mounting plate acts as a spring pulling the ODU toward the antenna assembly.

However, these methods are not ideally suited for situations where more than one waveguide is coupled with the antenna assembly. For example, in order to satisfy the demand for increased capacity in radio frequency (RF) systems, 2-transmitter/2-receiver (2T2R) RF radios have been developed. Unlike traditional RF radios which house one transmitter and one receiver in an enclosure (i.e., 1T1R ODUs), 2T2R radios combine two transmitters and two receivers in a single enclosure. As a result, 2T2R ODUs have two antenna ports as opposed to a single antenna port, as in a traditional 1T1R ODU.

The need to align and make physical contact across two waveguide interfaces presents additional challenges. Since the 2T2R ODU has two antenna ports, it cannot be mounted directly to an antenna assembly that has only one feed head. Instead, another piece of equipment (e.g., a hybrid coupler, an orthogonal mode transducer) is introduced to combine the two ports of the 2T2R ODU to one waveguide antenna port, which is in turn mounted to the antenna assembly. A hybrid coupler combines the RF signals from the two antenna ports of the 2T2R ODU onto one antenna port. An orthogonal mode transducer (OMT) combines the RF signals from the two antenna ports of the 2T2R ODU onto one antenna port as orthogonal polarized signals. Therefore, two separate rigid waveguide interfaces exist between the 2T2R ODU and the hybrid coupler or OMT.

The disclosed embodiments provide spring-loaded waveguide couplings that couple waveguides from different RF components (e.g., couple a waveguide on an ODU and waveguide on an antenna assembly). These spring-loaded waveguide couplings absorb the tolerances of the rigid parts of an ODU/antenna assembly coupling, described above in the background section. Thus, these waveguide couplings simplify the mounting of the ODU to the antenna assembly. The disclosed embodiments further provide a 2T2R ODU having two spring-loaded waveguide interfaces. The two spring-loaded waveguide interfaces absorb tolerances independently. This ensures that the surface surrounding each waveguide of the antenna feed head is in contact with a corresponding (e.g., mating) surface of an ODU antenna port.

FIG. 1 illustrates an outdoor unit 100 (ODU) coupled with an antenna assembly 102, in accordance with some embodiments. Antenna assembly 102 is mounted to a pole 104 using brackets 106. ODU 100 is mounted to a mounting plate 108. This type of mounting is known as a direct mount or direct mount installation. In some embodiments, ODU 100 is coupled with antenna assembly 102 using any of the waveguide couplings described herein.

Figure 2:
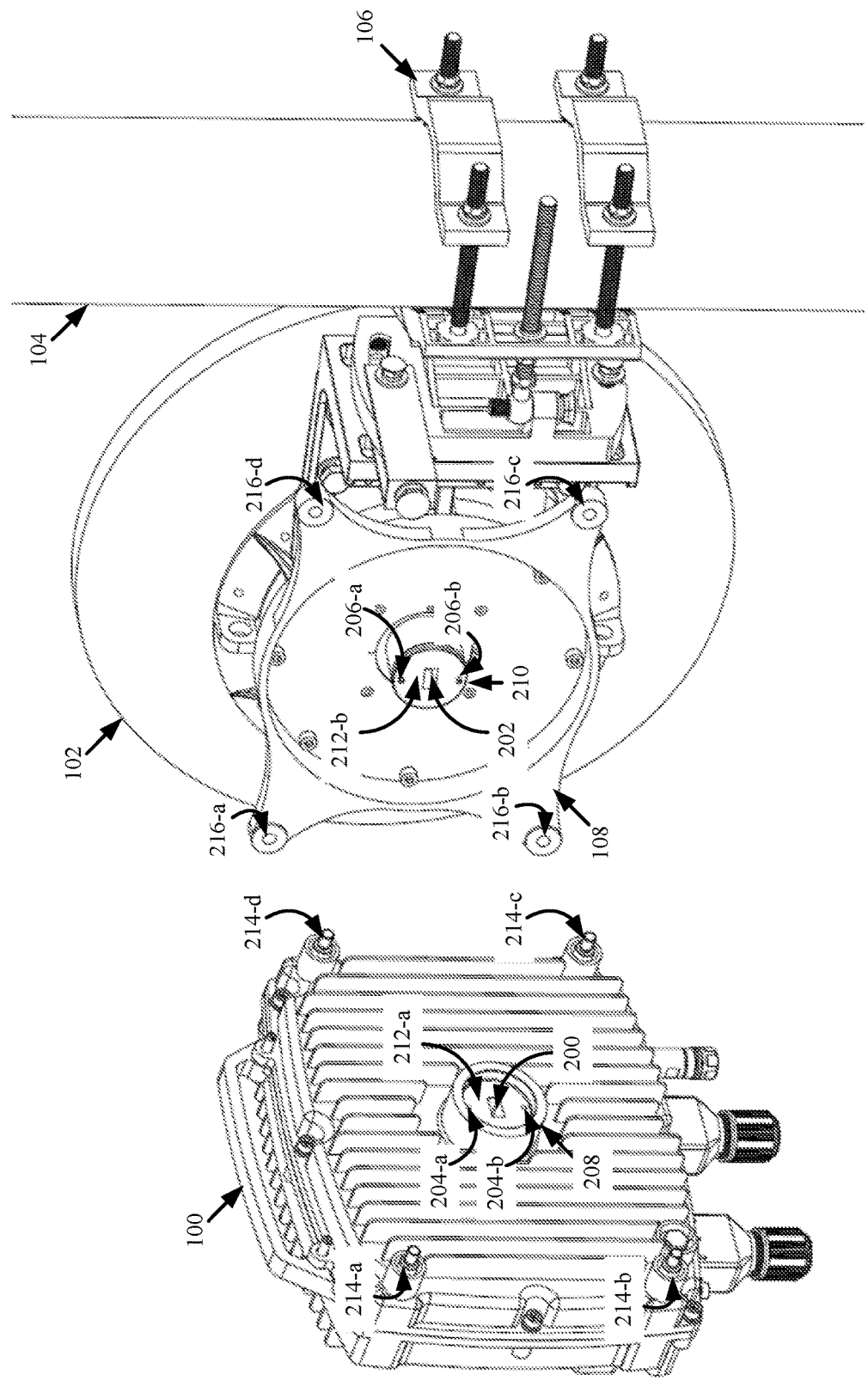
FIG. 2 is an exploded view of the coupling of the ODU with the antenna assembly shown in FIG. 1.

FIG. 2 is an exploded view of the coupling of ODU 100 with antenna assembly 102, shown in FIG. 1. In some embodiments, ODU 100 includes a single waveguide 200 to be coupled to an external waveguide 202 on antenna assembly 102. In some embodiments, ODU 100 is a 1T1R ODU. However, in some embodiments, ODU 100 includes a combiner (e.g., an RF hybrid combiner or an orthogonal mode transducer) that is internal to ODU 100, and thus only a single interface is required. A surface 212-a surrounding waveguide 200 couples with a surface 212-b surrounding external waveguide 202. Holes 204-a and 204-b receive guide pin 206-a and 206-b, respectively, to facilitate alignment of waveguide 200 and external waveguide 202. Waveguide 200, holes 204-a and 204-b, and surface 212-a constitute an antenna port 208 of ODU 100. External waveguide 202, guide pins 206-a and 206-b, and surface 212-b constitute an antenna feed head 210. Waveguide 200 is configured to transmit an RF signal via an electro-magnetic (EM) wave (e.g., an RF signal) to external waveguide 202.

In some embodiments, ODU 100 includes a mechanical mounting (e.g., screws or a draw latch) for attaching ODU 100 to mounting plate 108. For example, ODU 100 includes through-holes (e.g., through-holes 214-a, 214-b, 214-c, and 214-d) adapted to receive screws. The screws are adapted to be screwed into threaded holes (e.g., threaded holes 216-a, 216-b, and 216-c, 216-d) of mounting plate 108.

Antenna feed head 210 is an RF interface for antenna assembly 102 that interfaces with ODU 100. Antenna port 208 of ODU 100 is an RF interface for ODU 100 that interfaces with antenna assembly 102. Surface 212-a surrounding waveguide 200 and surface 212-b surrounding external waveguide 202 contact each other to improve the propagation of RF signals transmitted by waveguides 200/202. In some embodiments, antenna port 208 includes a waveguide coupling with a conductive spring, as described below.

Figure 3:
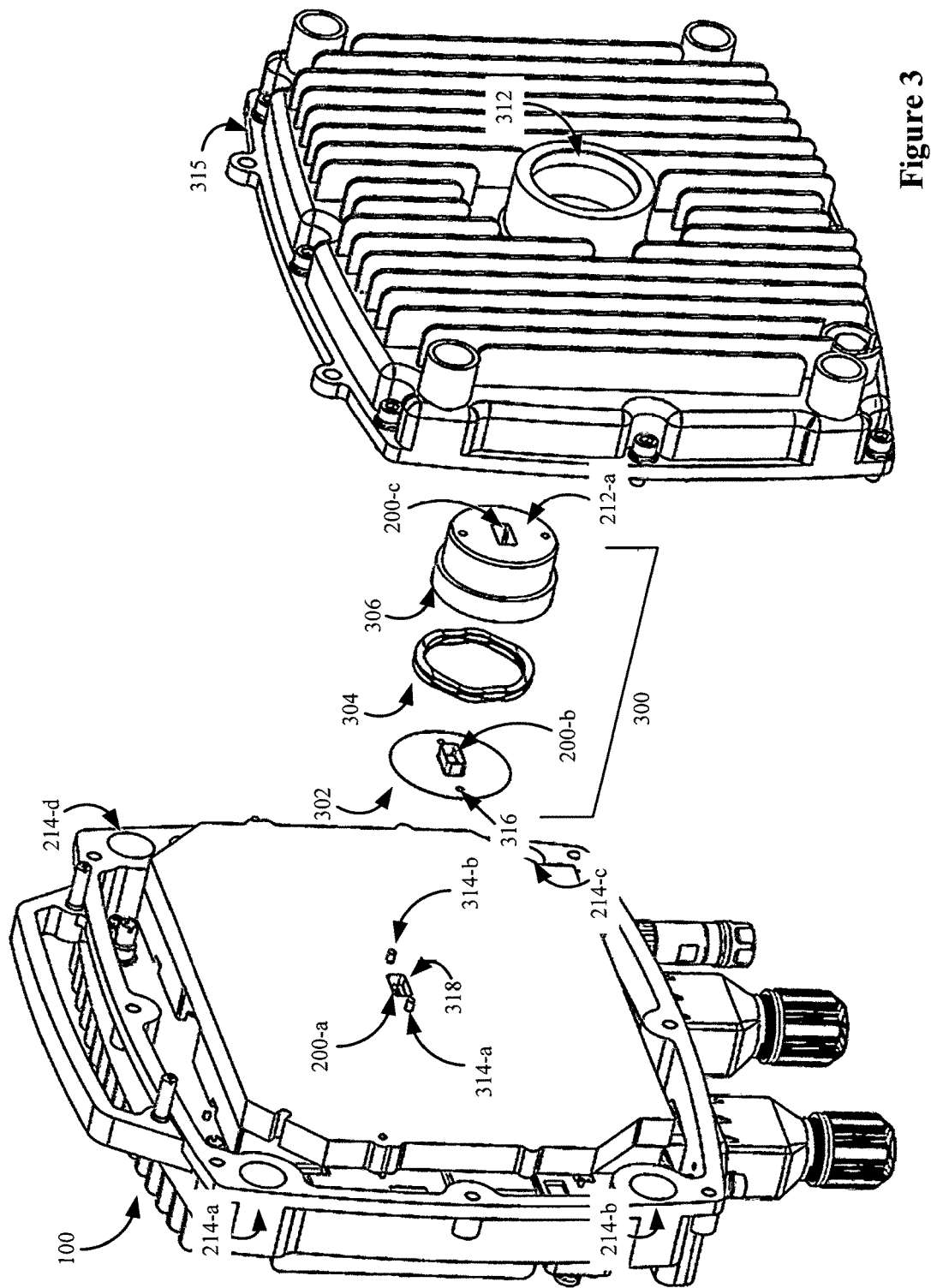
FIG. 3 illustrates an exploded view of a waveguide coupling within the ODU, in accordance with some embodiments.
Figure 4:
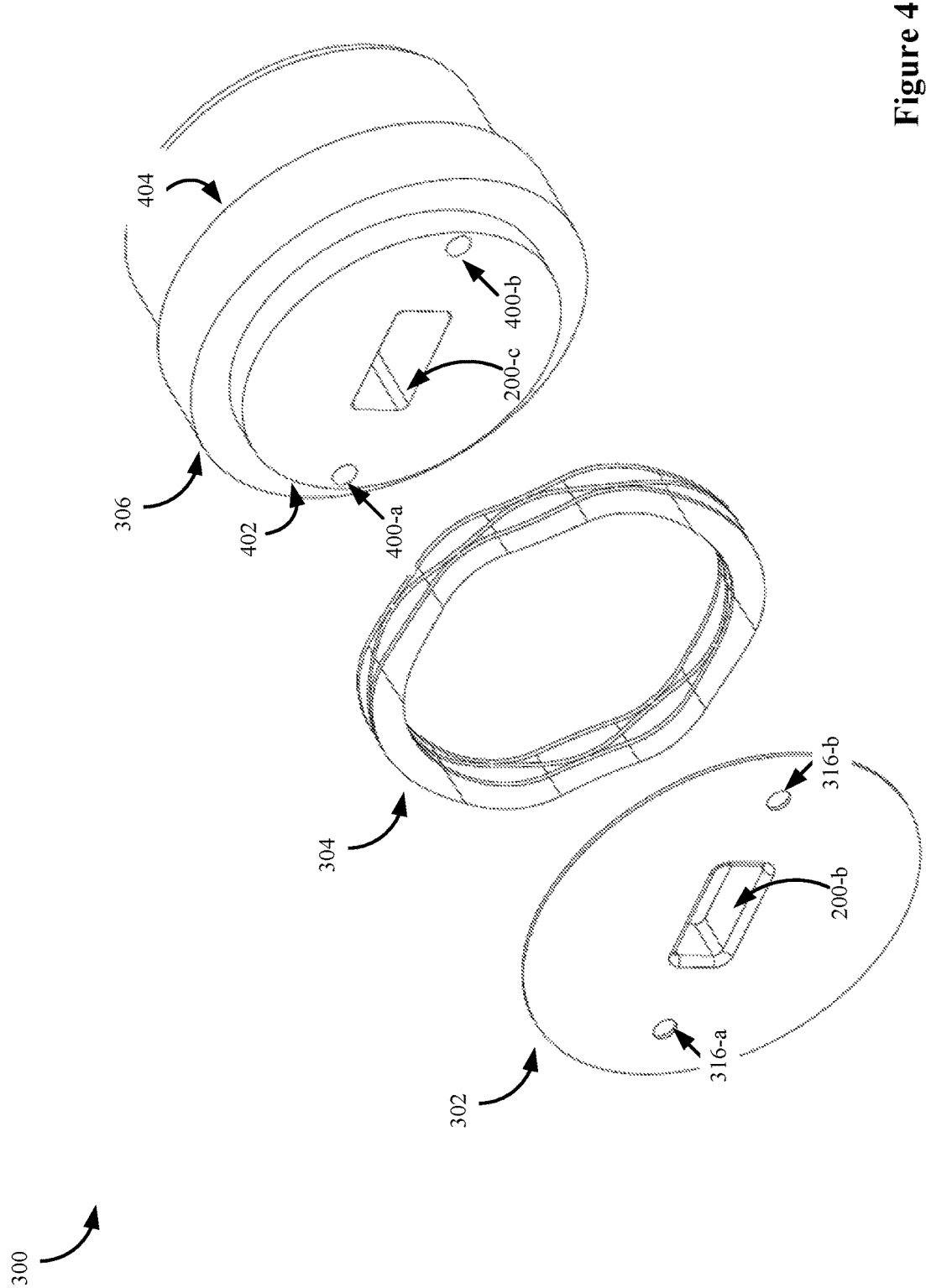
FIG. 4 illustrates a close up view of the waveguide coupling shown in FIG. 3.

FIG. 3 illustrates an exploded view of a waveguide coupling 300 within ODU 100, in accordance with some embodiments. FIG. 4 illustrates a close up view of waveguide coupling 300, shown in FIG. 3. In some embodiments, waveguide coupling 300 is used in antenna port 208 of ODU 100 (shown in FIGS. 1-2). As shown in FIG. 3, waveguide coupling 300 is positioned at least partially within a bore hole 312 of a housing 315 of ODU 100. A main body of ODU 100 includes a first portion 200-a of waveguide 200. RF signals, carried by EM waves, are routed to/from the receiver/transmitter of ODU 100. Waveguide coupling 300 is configured to receive the EM wave from first portion 200-a of waveguide 200 (FIG. 2) and transmit the EM wave to an external RF component (e.g., antenna feed head 210, FIG. 2). Waveguide coupling 300 is also configured to receive the EM wave from an external RF component and transmit the EM wave to first portion 200-a of waveguide 200. Waveguide coupling 300 includes: a waveguide plate 302 having a second portion 200-b of waveguide 200 formed therein; a waveguide spacer 306 having a third portion 200-c of waveguide 200 formed therein; and a conductive spring 304 circumferentially disposed around waveguide 200 in between waveguide plate 302 and waveguide spacer 306. Second portion 200-b of waveguide 200 (formed in waveguide plate 302) is inserted into third portion 200-c of waveguide 200 (formed in waveguide spacer 306).

In some embodiments, waveguide spacer 306 includes surface 212-a (e.g., the coupling surface that couples with the external waveguide of the external RF component, such as antenna assembly 102, FIGS. 1-2).

In some embodiments, waveguide plate 302 consists of a flat section (constituting a mating surface that mates with conductive spring 304) and a rectangular section (constituting waveguide portion 200-b).

In some embodiments, waveguide plate 302 consists of a very thin metal, such as steel, stamped from a single piece of metal so that it is very low cost. The flat section of waveguide plate 302 fits up against the main body of ODU 100 and the rectangular section forms second portion 200-b of waveguide 200 and aligns with first portion 200-a of waveguide 200 which exits the main body of ODU 100. Guides pins 314-a and 314-b installed in the main body of ODU 100 pass through holes 316-a and 316-b (FIGS. 3-4) in waveguide plate 302 to align the main body of ODU 100 and waveguide plate 302.

In some embodiments, waveguide spacer 306 is a metal part with a rectangular hole cut through it to form third portion 200-c of waveguide 200. In some embodiments, waveguide spacer 306 is made of aluminum due to its low cost and ease with which it is machined. However, waveguide spacer 306 can be made of any suitable metal, such as steel. Waveguide spacer 306 also has holes 400-a and 400-b (FIG. 4) in one side (not visible from the perspective shown in FIG. 3) which fit over guide pins 314-a and 314-b (e.g., metal dowels) to align portion 200-c of waveguide 200 with portion 200-b of waveguide 200. On the opposite side of waveguide spacer 306 is surface 212-a, which surrounds waveguide 200 and makes contact with antenna feed head 210 (FIG. 2).

In some embodiments, second portion 200-b of waveguide 200 is inserted, in use, into third portion 200-c of waveguide 200. In some embodiments, second portion 200-b fits within third portion 200-c (e.g., third portion of 200-c provides a snug slip fit, wherein second portion 200-b is in contact with third portion 200-c but can slide in and out to allow conductive spring 304 to take up the tolerances). In some embodiments, the impedance formed by the junction of second portion 200-b and third portion 200-c varies smoothly across the junction. In some embodiments, the fit between second portion 200-b and third portion 200-c aides in aligning waveguide plate 302 and waveguide spacer 306 (along with guide pins 314-a and 314-b, FIG. 3, which extend through holes 316-a and 316-b and into holes 400-a and 400-b, FIG. 4).

Waveguide coupling 300 is a spring-loaded waveguide coupling. Conductive spring 304 pushes waveguide plate 302 out so that waveguide plate 302 is in circumferential contact with surface 318 (FIG. 3) surrounding first portion 200-a of waveguide 200, providing circumferential electrical continuity between first portion 200-a and second portion 200-b of waveguide 200. Conductive spring 304 itself is flush with both waveguide plate 302 and waveguide spacer 306, providing circumferential electrical continuity between second portion 200-b and third portion 200-c of waveguide 200. Conductive spring 304 also pushes waveguide spacer 306 out so that surface 212-a is in circumferential contact with surface 212-b, providing circumferential electrical continuity between third portion 200-c of waveguide 200 and external waveguide 202.

As shown in FIG. 4, in some embodiments, waveguide spacer 306 includes a first flange 402 and a second flange 404. Conductive spring 304 fits around first flange 402 such that, in use, conductive spring 304 is circumferentially disposed around first flange 402. In some embodiments, conductive spring 304 forms a slip fit (or an even looser fit) with first flange 402 (e.g., an inner diameter of conductive spring 304 is at least a few tens of microns larger than an inner diameter of first flange 402).

Figure 5:
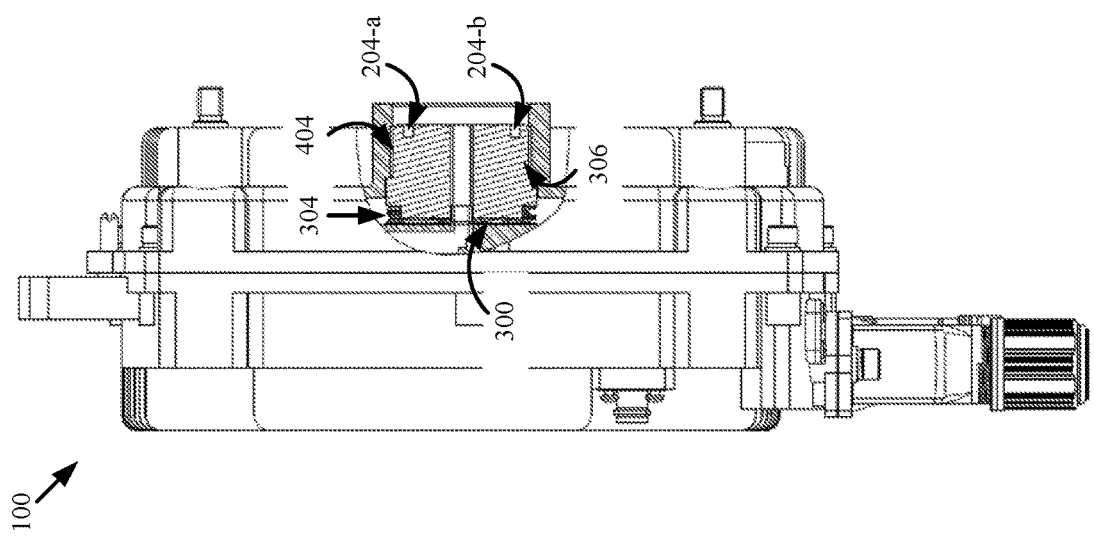
FIG. 5 illustrates a cross-sectional assembled view of the ODU shown in FIG. 3.
Figure 6:
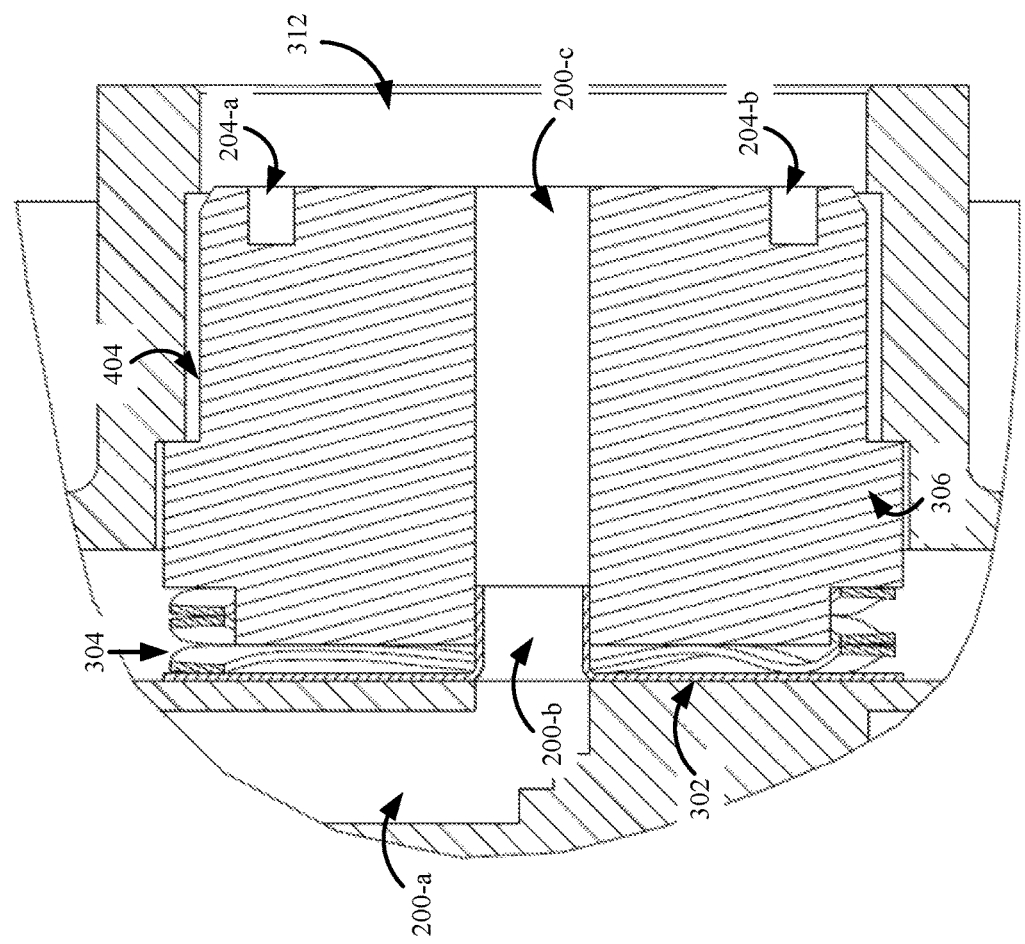
FIG. 6 illustrates a close up of a portion of the assembled view of the ODU shown in FIG. 5.

In some embodiments, second flange 404 is disposed at least partially within bore hole 312 (see FIGS. 5-6).

In some embodiments, ODU 100 includes an RF combining component. In various embodiments, the RF combining component is a duplexer, a circulator network, hybrid coupler, OMT, or any other component which combines RF signals. For example, an OMT combines the RF signals, carried by distinct EM waves, from the antenna ports of a 2T2R ODU onto one antenna port as orthogonally polarized signals. A dual polarization antenna is used with the 2T2R ODU to support the orthogonally polarized signals.

In some embodiments, when screws are screwed into threaded holes 216-a, 216-b, 216-c, and 216-d of mounting plate 108 (FIG. 2), conductive spring 304 is compressed. All of the adjacent surfaces of waveguide coupling 300 are then substantially flush to one another. This provides a conductive seal to waveguide coupling 300 which improves an electrical connection of waveguide coupling 300.

Figure 7:
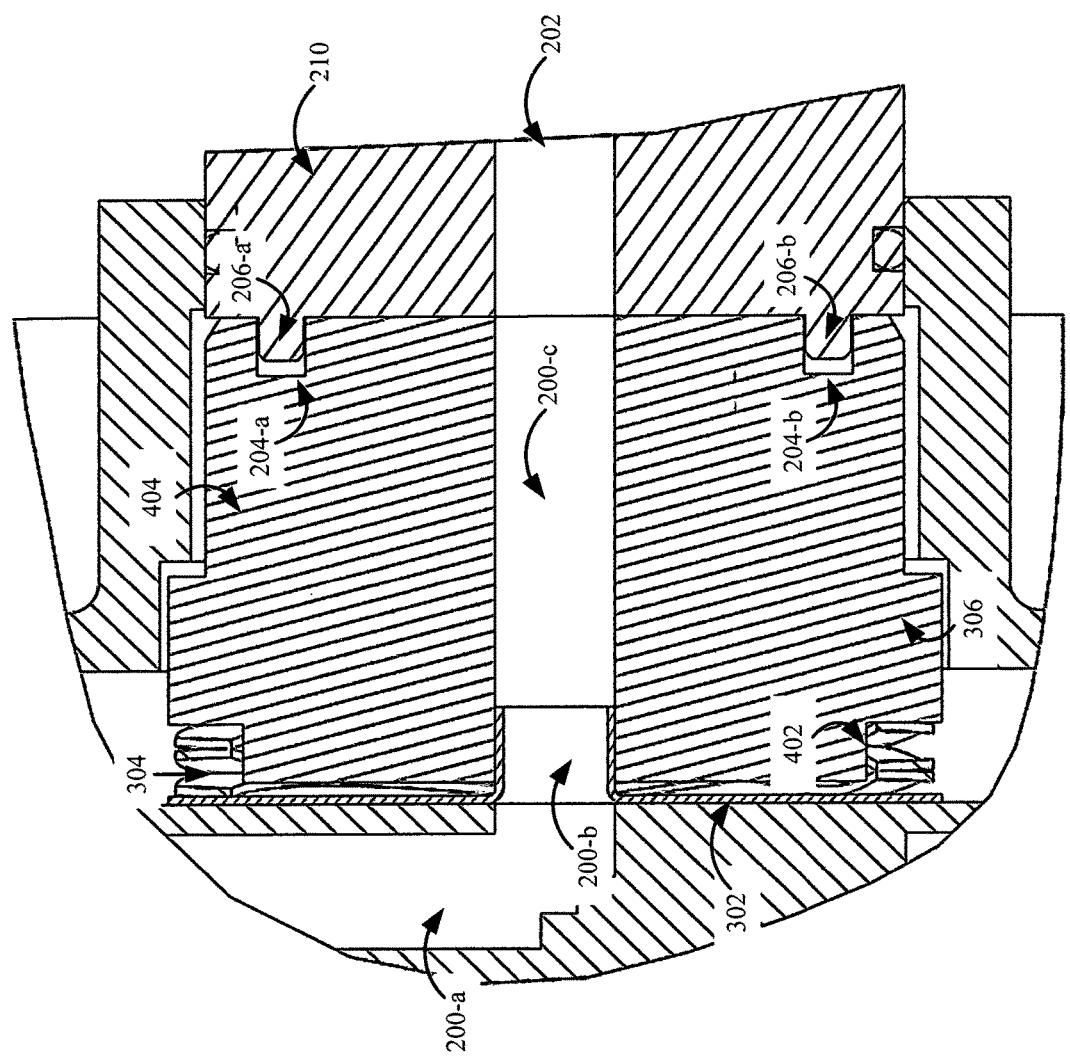
FIG. 7 also shows a close up of a portion of the assembled view of the ODU, shown in FIG. 5, but in FIG. 7 the ODU is coupled with an external RF component.

For the reader's convenience, FIGS. 5-7 illustrate various views of features that have already been described above. FIG. 5 illustrates a cross-sectional assembled view of ODU 100 shown in FIG. 3, with waveguide coupling 300. FIG. 6 illustrates a close up of a portion of the assembled view of ODU 100 shown in FIG. 5. FIG. 7 also shows a close up of a portion of the assembled view of ODU 100, shown in FIG. 5, but in FIG. 7 ODU 100 is coupled with an external RF component (e.g., antenna feed head 210). As described above, waveguide spacer 306 includes holes 204-a and 204-b. As shown in FIG. 7, in some embodiments, each hole receives a guide pin (e.g., guide pin 206-a or 206-b) that aligns second portion 200-b of waveguide 200 with antenna feed head 210 (and more specifically, external waveguide 202 of antenna feed head 210), as shown in FIG. 2. Thus, FIG. 7 shows waveguide coupling 300 after ODU 100 has been installed on antenna feed head 210.

In addition, FIGS. 5-7 illustrate that, in some embodiments, bore hole 312 (FIG. 3) is designed to allow waveguide coupling 300 to mate with antenna feed head 210 within bore hole 312. This helps keep dirt and debris out of the interface. To that end, bore hole 312 has a largest section, proximal to portion 200-a (FIGS. 6 and 7) of waveguide 200, that has a first radius. The largest section is adapted to provide a slip fit with the largest radius of waveguide spacer 306. Bore hole 312 has a smaller section with a second radius that is smaller than the largest radius of waveguide spacer 306 and is adapted to provide a slip fit to flange 404 of waveguide spacer 306. Bore hole 312 has a still smaller section that has a radius adapted to receive antenna feed head 210 and provide a slip fit with antenna feed head 210.

In some embodiments, the slip fits described herein are loose enough to accommodate angular tolerances between mechanical components (e.g., tolerances that result in ODU 100 being not precisely angularly aligned with mounting plate 108). Thus, guide pins 206-a and 206-b, holes 204-a and 204-b (FIG. 7), the various radii of waveguide spacer 306, and bore hole 312 are all sized appropriately to take up angular tolerances as well as tolerances in displacement.

Figure 8:
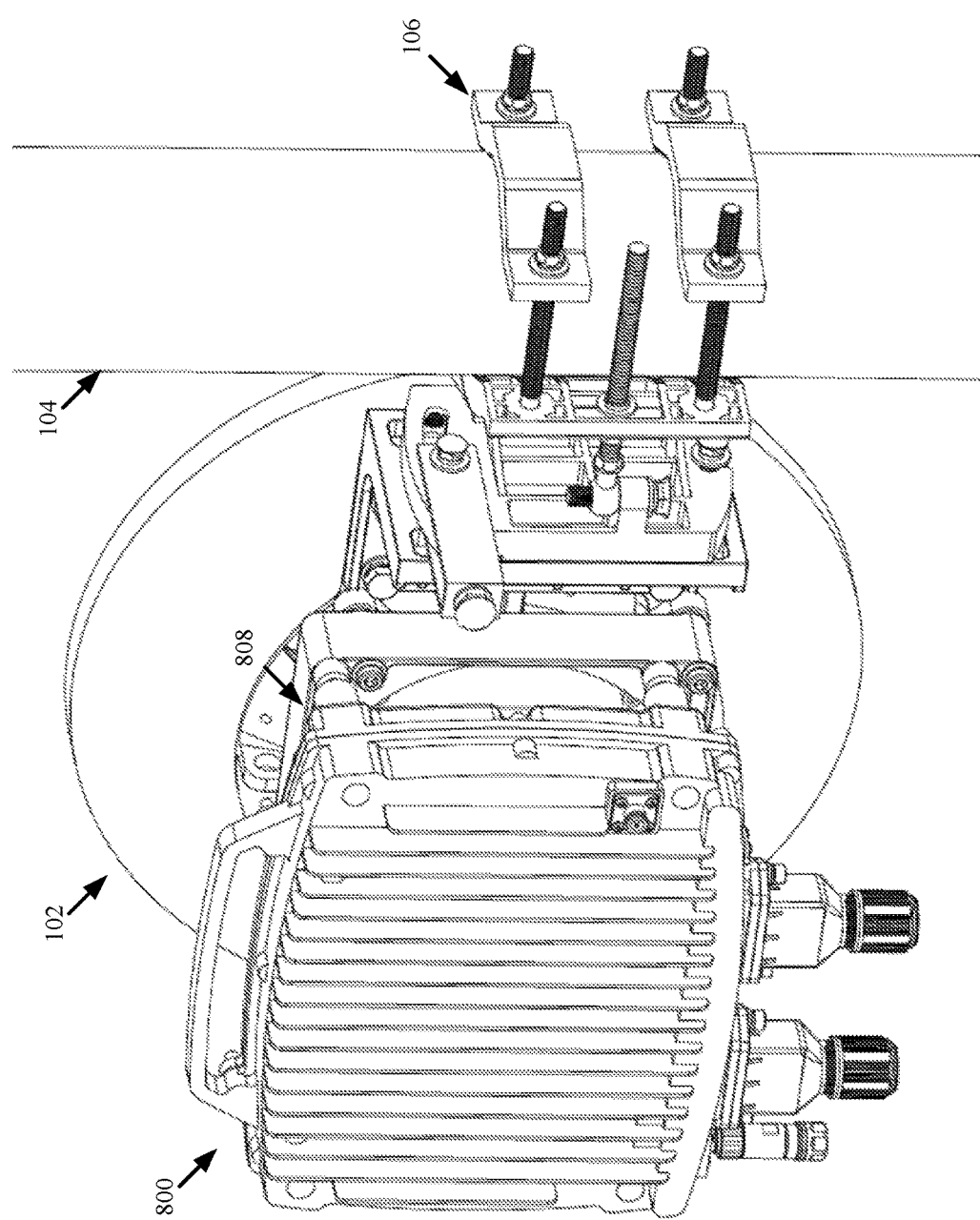
FIG. 8 illustrates a 2T2R outdoor unit (ODU) coupled with an antenna assembly, in accordance with some embodiments.
Figure 9:
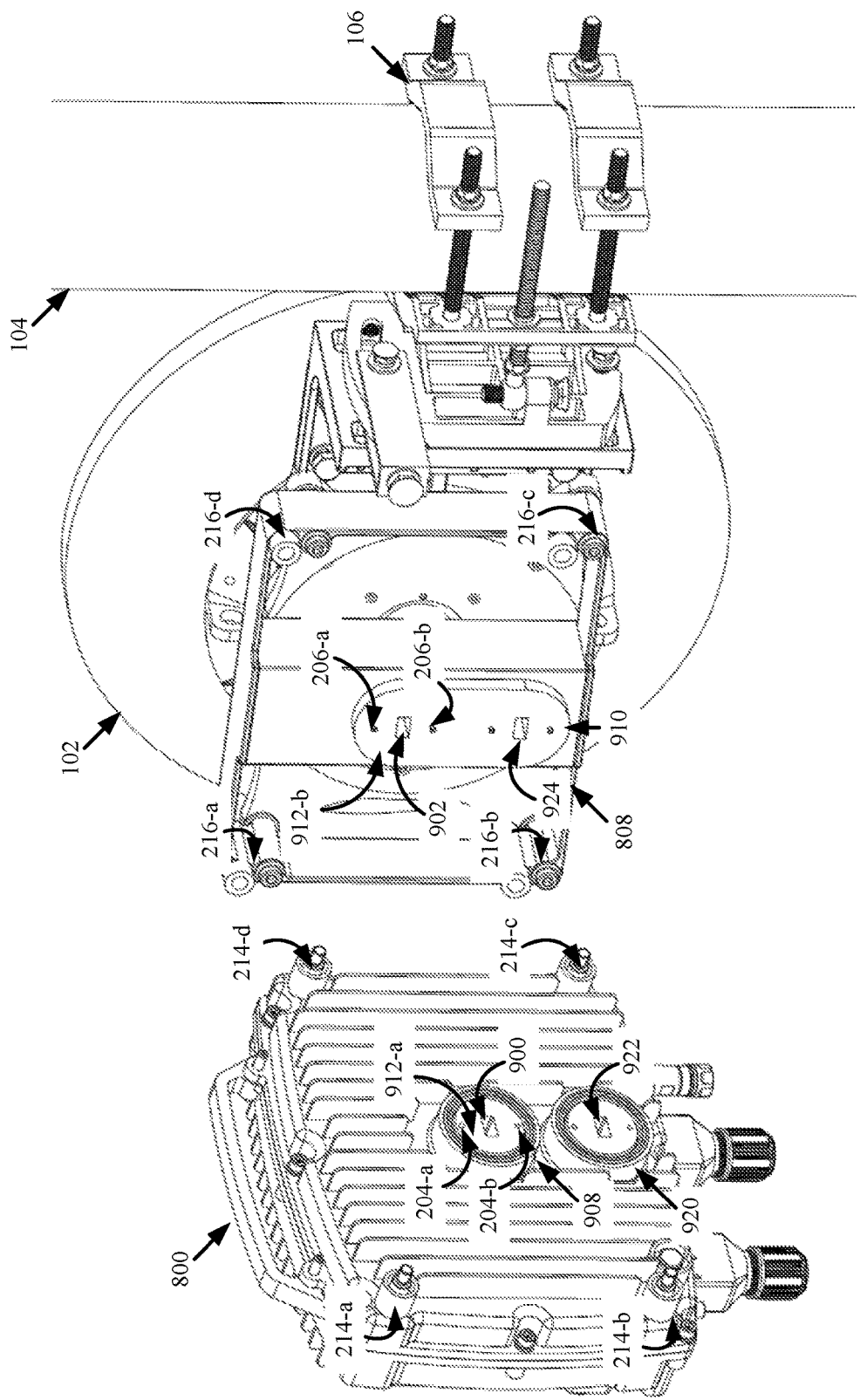
FIG. 9 is an exploded view of the coupling of the 2T2R ODU with the antenna assembly shown in FIG. 8.
Figure 10:
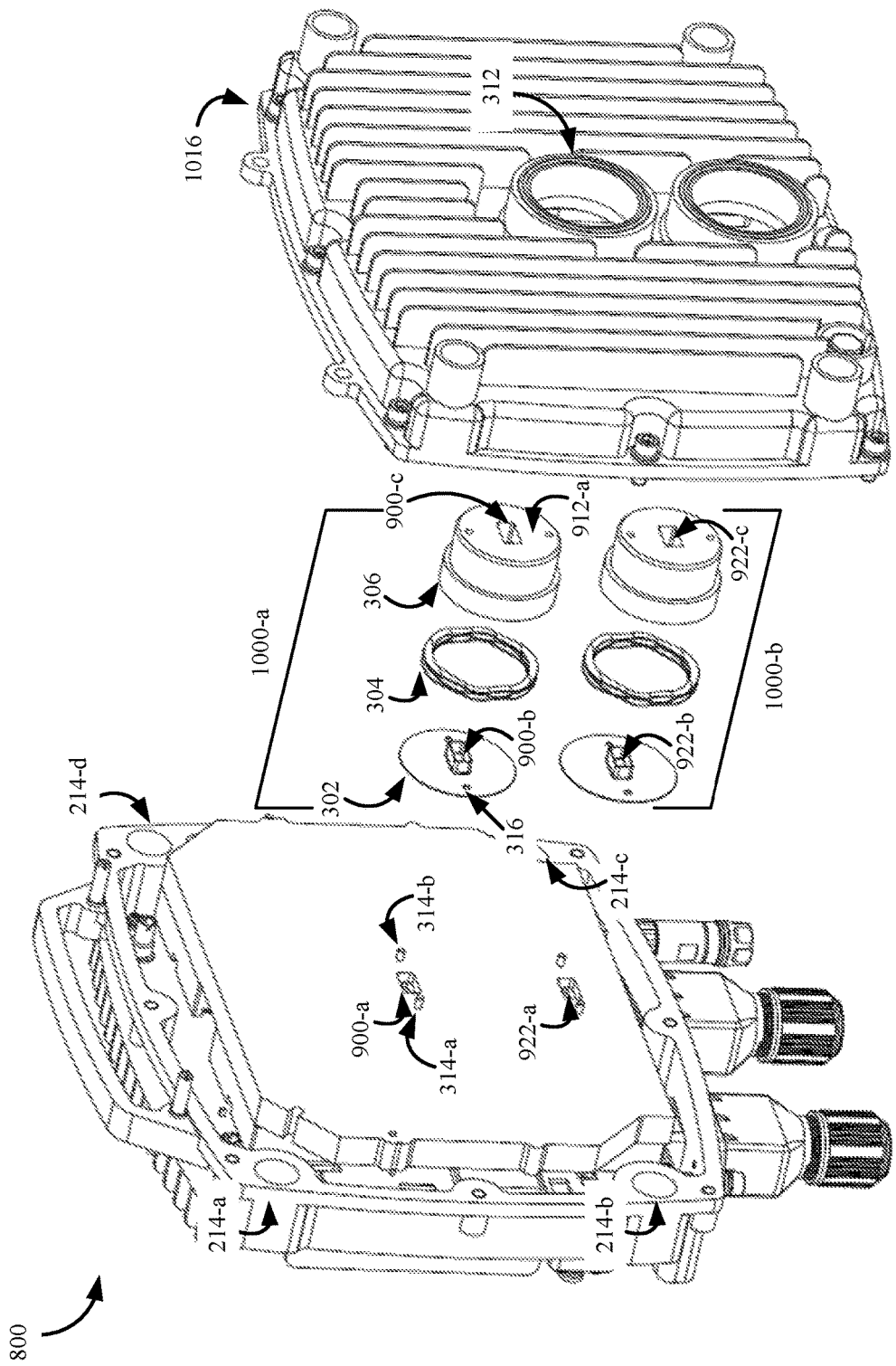
FIG. 10 illustrates an exploded view of the waveguide couplings within the 2T2R ODU shown in FIG. 8, in accordance with some embodiments.

FIGS. 8-10 illustrate embodiments in which an RF component (e.g., an ODU) includes first and second waveguide couplings configured to transmit first and second EM waves, respectively, to first and second external waveguides of an external RF component. The first external waveguide is rigidly coupled with the second external waveguide. To that end, in some embodiments, the waveguide couplings shown in FIGS. 8-10 are analogous to waveguide coupling 300 in FIG. 5. The two waveguide couplings take up the tolerances necessitated by the rigid coupling of the two waveguides and other mechanical components. As usual, like reference numerals refer to corresponding parts throughout the drawings. Thus, parts labeled in FIGS. 8-10 that have the same reference number as parts in earlier drawings are substantially analogous to those parts in the earlier drawings and, for brevity, are not described below.

FIG. 8 illustrates an outdoor unit 800 (ODU) coupled with an antenna assembly 102, in accordance with some embodiments. In some embodiments, ODU 800 is coupled to antenna assembly 102 through an external RF component 808. In some embodiments, external RF component 808 combines RF signals from ODU 800 and transmits a single combined RF signal to antenna assembly 102. In some embodiments, RF component 808 receives a single combined RF signal from antenna assembly 102 and divides the single combined RF signal into two signals. RF component 808 transmits the two, divided, RF signals to waveguides 900/922 on ODU 800 (i.e., as shown in FIG. 9, one signal is transmitted to waveguide 900 and the other signal is transmitted to waveguide 922). In some embodiments, external RF component 808 is one of an orthogonal mode transducer (OMT); an RF combiner; an RF splitter; and an RF hybrid. In some embodiments, external RF component 808 is mounted to both ODU 800 and antenna assembly 102.

For example, an OMT combines the RF signals, carried by distinct EM waves, from the two antenna ports of a 2T2R ODU onto one antenna port as orthogonally polarized signals. A dual polarization antenna is used with the 2T2R ODU to support the orthogonally polarized signals.

FIG. 9 is an exploded view of the coupling of ODU 800 with antenna assembly 102 shown in FIG. 8. ODU 800 includes a first waveguide 900 to be coupled to an external waveguide 902 on external RF component 808 and also includes a second waveguide 922 to be coupled to an external waveguide 924 on external RF component 808. In some embodiments, ODU 800 is a 2T2R ODU. Thus, ODU 800 includes first antenna port 908, which is configured to transmit and/or receive a first EM wave to first external waveguide 902 of external RF component 808, and second antenna port 920, which is configured to transmit and/or receive a second EM wave to second external waveguide 924 of external RF component 808. First external waveguide 902 is rigidly coupled with second external waveguide 924.

To that end, a surface 912-a surrounding waveguide 900 couples with a surface 912-b surrounding external waveguide 902. A surface surrounding waveguide 922 also couples with surface 912-b, but for visual clarity that surface is not numbered. That surface also includes holes analogous to holes 204-a and 204-b, but for visual clarity, those holes are also not numbered. Thus, ODU 800 has two antenna ports (e.g., antenna port 908 and antenna port 920) that are analogous to antenna port 208 described above. The external waveguides 902/924, guide pins 206-a and 206-b, and surface 912-b constitute a feed head 910 for external RF component 808. Feed head 910 is an RF interface for external RF component 808 that interfaces with ODU 800. Antenna port 908 and antenna port 920 constitute ODU 800's interface for external RF component 808.

FIG. 10 illustrates an exploded view of waveguide couplings (e.g., waveguide couplings 1000-a and 1000-b) within ODU 800, in accordance with some embodiments. Waveguide couplings 1000-a and 1000-b are analogous to waveguide coupling 300, described above. That is, waveguide couplings 1000-*a* and 1000-*b* are spring-loaded waveguide couplings. To that end, each waveguide coupling 1000-*a* and 1000-*b* includes a waveguide plate 302, a waveguide spacer 306, and a conductive spring 304 circumferentially disposed around a respective waveguide.

Waveguide coupling 1000-*a* couples with a first portion 900-*a* of a waveguide 900 (labeled in FIG. 9) that is integral to ODU 800 (e.g., within the main body of ODU 800). Waveguide coupling 1000-*a* has, formed within its waveguide plate 302, a second portion 900-*b* of waveguide 900. Waveguide coupling 1000-*a* also has, formed within its waveguide spacer 306, a third portion 900-*c* of waveguide 900. Likewise, waveguide coupling 1000-*b* couples with a first portion 922-*a* of a waveguide 922 (labeled FIG. 9) that is integral to ODU 800. Waveguide coupling 1000-*b* has, formed within its waveguide plate 302, a second portion 922-*b* of waveguide 922. Waveguide coupling 1000-*b* also has, formed within its waveguide spacer 306, a third portion 922-*c* of waveguide 922. Each waveguide coupling 1000 of ODU 800 is positioned at least partially within a bore hole 312 of a housing 1016 of ODU 800.

Waveguide couplings 1000-*a* and 1000-*b*, being analogous to waveguide coupling 300, provide electrical continuity across waveguides 900 and 922, in an analogous manner to that described above with reference to waveguide coupling 300 and waveguide 200.

Waveguide couplings 1000-*a* and 1000-*b* account for the tolerance accumulation both between the mounting points and the waveguide interfaces of the assemblies, as well as the tolerances between the two waveguide interfaces.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles of the disclosure and its practical applications, to thereby enable others skilled in the art to best utilize the various implementations with various modifications as are suited to the particular use contemplated.

It will be understood that, although the terms "first," "second," etc. are sometimes used herein to describe various elements, these elements should not be limited by these terms. These terms are only used to distinguish one element from another. For example, a first element could be termed a second element, and, similarly, a second element could be termed a first element, without changing the meaning of the description, so long as all occurrences of the "first element" are renamed consistently and all occurrences of the second element are renamed consistently. The first element and the second element are both elements, but they are not the same element.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items.

It will be further understood that the terms "comprises" and/or "comprising," when used in this specification, specify the presence of stated features, integers, operations, elements, and/or components, but do not preclude the presence or addition of one or more other features, integers, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

Throughout the preceding description, various implementations are described within the outdoor units and antenna assemblies. This is purely for convenience of explanation and is not intended to limit the claims that follow. Various implementations described can be implemented in waveguide applications of any sort.

What is claimed is:

1. A radio-frequency (RF) component, comprising:
   a first antenna port that includes a first portion of a first waveguide configured to transmit a first electro-magnetic (EM) wave;
   a first waveguide coupling configured to receive the first EM wave from the first portion of the first waveguide and transmit the first EM wave to an external RF component, the first waveguide coupling including:
      a waveguide plate having a second portion of the first waveguide formed therein;
      a waveguide spacer having a third portion of the first waveguide formed therein; and
      a conductive spring circumferentially disposed around the first waveguide in between the waveguide plate and the waveguide spacer;
   a second antenna port, separate and distinct from the first antenna port, that includes a first portion of a second waveguide configured to transmit a second EM wave, wherein the first portion of the first waveguide is rigidly coupled with the first portion of the second waveguide; and
   a second waveguide coupling configured to receive the second EM wave from the first portion of the second waveguide and transmit the second EM wave to the external RF component.

2. The RF component of claim 1, wherein;
   the first waveguide coupling is configured to transmit the first EM wave to a first external waveguide, distinct from the first waveguide, of the external RF component; and
   the second waveguide coupling is configured to transmit the second EM wave to a second external waveguide, distinct from the second waveguide, of the external RF component, wherein the first external waveguide is rigidly coupled with the second external waveguide.

3. The RF component of claim 2, wherein the waveguide spacer has a first coupling surface that couples with the waveguide plate and a second coupling surface that couples with the first external waveguide.

4. The RF component of claim 1, wherein the second waveguide coupling includes:

a second waveguide plate having a second portion of the second waveguide formed therein;
a second waveguide spacer having a third portion of the second waveguide formed therein; and
a second conductive spring circumferentially disposed around the second waveguide in between the second waveguide plate and the second waveguide spacer.

5. The RF component of claim 1, wherein the first waveguide coupling and the second waveguide coupling comprise an interface for the external RF component.

6. The RF component of claim 5, further comprising a mechanical mounting for attaching the RF component to the external RF component, wherein attaching the RF component to the external RF component compresses the conductive spring to improve an electrical connection of the first waveguide coupling.

7. The RF component of claim 1, wherein:
the waveguide spacer includes a first flange; and
the conductive spring is circumferentially disposed around the first flange.

8. The RF component of claim 1, wherein the second portion of the first waveguide formed in the waveguide plate is inserted into the third portion of the first waveguide formed in the waveguide spacer.

9. The RF component of claim 1, further comprising:
a housing having a bore hole,
wherein the waveguide spacer includes a second flange disposed at least partially within the bore hole.

10. The RF component of claim 1, wherein the waveguide spacer includes a first hole and a second hole, wherein each of the first hole and the second hole receive a respective guide pin that aligns the second portion of the first waveguide with the external RF component.

11. The RF component of claim 1, wherein the waveguide plate includes a third hole and a fourth hole, wherein each of the third hole and the fourth hole are for receiving a guide pin that aligns the first portion of the first waveguide with the second portion of the first waveguide.

12. The RF component of claim 1, wherein the RF component includes a 2-transmitter/2-receiver (2T2R) outdoor unit (ODU).

13. The RF component of claim 12, wherein the first waveguide coupling and the second waveguide coupling form an interface for the 2T2R ODU.

* * * * *